(12) United States Patent
Zou et al.

(10) Patent No.: US 10,996,235 B2
(45) Date of Patent: May 4, 2021

(54) SYSTEM AND METHOD FOR CYCLE DURATION MEASUREMENT IN REPEATED ACTIVITY SEQUENCES

(71) Applicant: Robert Bosch GmbH, Stuttgart (DE)

(72) Inventors: Lincan Zou, San Jose, CA (US); Liu Ren, Cupertino, CA (US); Cheng Zhang, Irvine, CA (US)

(73) Assignee: Robert Bosch GmbH, Stuttgart (DE)

( * ) Notice: Subject to any disclaimer, the term of this patent is extended or adjusted under 35 U.S.C. 154(b) by 368 days.

(21) Appl. No.: 16/236,753

(22) Filed: Dec. 31, 2018

(65) Prior Publication Data

US 2020/0209276 A1    Jul. 2, 2020

(51) Int. Cl.
*G01P 13/00*    (2006.01)
*G06F 3/147*    (2006.01)

(52) U.S. Cl.
CPC .............. *G01P 13/00* (2013.01); *G06F 3/147* (2013.01)

(58) Field of Classification Search
CPC .......... G01P 13/00; G09G 5/393; G06F 3/147
See application file for complete search history.

(56) References Cited

U.S. PATENT DOCUMENTS

| | | | | | |
|---|---|---|---|---|---|
| 3,920,967 | A | * | 11/1975 | Martin | G08G 1/08 701/118 |
| 5,210,444 | A | * | 5/1993 | Johnson | G01R 25/08 327/175 |
| 9,826,343 | B2 | * | 11/2017 | Kwon | H04W 24/08 |
| 2007/0075753 | A1 | * | 4/2007 | Parker | G01R 29/02 327/116 |

OTHER PUBLICATIONS

ProGlove Smart, Wearable Barcode Scanners, retrieved from https://www.proglove.com/ on Jul. 23, 2019.
Toyoda, M. et al., Pattern discovery in data streams under the time warping distance, The VLDB Journal (Jun. 2013) vol. 22, Issue 3, pp. 295-318 retrieved from https://doi.org/10.1007/s00778-012-0289-3 on May 23, 2019.

* cited by examiner

*Primary Examiner* — Elias Desta
(74) *Attorney, Agent, or Firm* — Brooks Kushman P.C.

(57) ABSTRACT

Using a global optimization, a cycle within a frame buffer including frames corresponding to one or more cycles of query activity sequences is detected. The detection includes creating a plurality of cycle segmentations by recursively iterating through the frame buffer to identify candidate cycles corresponding to cycles of a reference activity sequence until the frame buffer lacks sufficient frames to create additional cycles, computing segmentation errors for each of the plurality of cycle segmentations, and identifying the detected cycle as the one of the plurality of cycle segmentations having a lowest segmentation error. Cycle duration data for the detected cycle is generated. Frames belonging to the detected cycle are removed from the frame buffer. The cycle duration data is output.

20 Claims, 5 Drawing Sheets

SYSTEM AND METHOD FOR CYCLE DURATION MEASUREMENT IN REPEATED ACTIVITY SEQUENCES

TECHNICAL FIELD

The present disclosure relates to systems and methods for measurement of cycle duration in repeated activity sequences.

BACKGROUND

Aspects of human movement can have a large impact on, for example, the way a tool is designed, the way a workspace is laid out, or the way a task is performed. Understanding how the human body can move and interact with objects and the environment can result in tools that are more ergonomic, workspaces that are more efficient to navigate, and tasks that more intuitive to perform. The range of possible human motions and gestures is vast, however, and simple tasks, such as lifting a cup, pointing in a direction, or turning a screw, often result from a complex set of biomechanical interactions. This relation of simple result from complex movement can make human motions and gestures extremely difficult to quantify or understand in a meaningful or practical way.

SUMMARY

In one or more illustrative examples, a system for measurement of cycle duration in repeated activity sequences includes a display device, a memory configured to store a motion analysis application and motion capture data including a reference activity sequence and a frame buffer including frames corresponding to one or more cycles of query activity sequences, and a processor, operatively connected to the memory and the display device. The processor is configured to execute the motion analysis application to detect a cycle within the frame buffer using a global optimization, including to create a plurality of cycle segmentations by recursively iterating through the frame buffer to identify candidate cycles until the frame buffer lacks sufficient frames to create additional cycles, compute segmentation errors for each of the plurality of cycle segmentations, and identify the detected cycle as the one of the plurality of cycle segmentations having a lowest segmentation error, generate cycle duration data for the detected cycle, remove frames belonging to the detected cycle from the frame buffer, and output the cycle duration data to the display device.

In one or more illustrative examples, a method for measurement of cycle duration in repeated activity sequences includes detecting, using a global optimization, a cycle within a frame buffer including frames corresponding to one or more cycles of query activity sequences, the detecting including creating a plurality of cycle segmentations by recursively iterating through the frame buffer to identify candidate cycles corresponding to cycles of a reference activity sequence until the frame buffer lacks sufficient frames to create additional cycles, computing segmentation errors for each of the plurality of cycle segmentations, and identifying the detected cycle as the one of the plurality of cycle segmentations having a lowest segmentation error, generating cycle duration data for the detected cycle; removing frames belonging to the detected cycle from the frame buffer; and outputting the cycle duration data to the display device.

In one or more illustrative examples, non-transitory computer readable medium comprising instructions of a motion analysis application that, when executed by one or more processors, cause the one or more processors to detect, using a global optimization, a cycle within a frame buffer including frames corresponding to one or more cycles of query activity sequences, the detecting including to create a plurality of cycle segmentations by recursively iterating through the frame buffer to identify candidate cycles corresponding to cycles of a reference activity sequence until the frame buffer lacks sufficient frames to create additional cycles, compute segmentation errors for each of the plurality of cycle segmentations, and identify the detected cycle as the one of the plurality of cycle segmentations having a lowest segmentation error, generate cycle duration data for the detected cycle; remove frames belonging to the detected cycle from the frame buffer; continue to detect additional cycles within the frame buffer using the global optimization until the frame buffer lacks sufficient cycles for an additional cycle; and output the cycle duration data.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In industry, it is an important yet challenging to measure cycle duration in repeated physical human activities based on inertial measurement unit (IMU) data. For example, the productivity level of the assembly line in a factory can be improved based on accurate measurement of repeated actions of operators. However, manual measurement of repeated cycles is labor intensive. Hence, it is necessary to develop a solution to measure the cycle duration automatically. Some systems perform real-time detection of cycles from repeated activities based on pre-recorded standardized operations. However, such systems are best suited to repeated activities with high standardization level, but are less suited to measuring cycle duration of repeated activities with many abnormalities. The high standardization level means that there are fewer motion differences in terms of orientation and speed between the query activities and the recorded standardized cycle.

This disclosure proposes a solution to measure cycle duration in repeated physical human activities using the time-series data from IMUs, with improved performance. In contrast to some systems which operate in a purely real-time manner, the proposed approach measures cycle duration in repeated activity sequences streamed into or otherwise stored into a buffer. The proposed approach utilizes global optimization of all activities stored in the buffer with the aim to minimize the total error of all cycle durations. Hence, the cycle duration measurement accuracy is improved dramatically. The accuracy and the response delay are positively correlated with the buffer size. For highly standardized repeated activities, a relatively smaller buffer size could still achieve the accuracy expectation. However, the response delay is reduced with the smaller buffer size. Further aspects of the disclosure are discussed in detail below.

Figure 1:
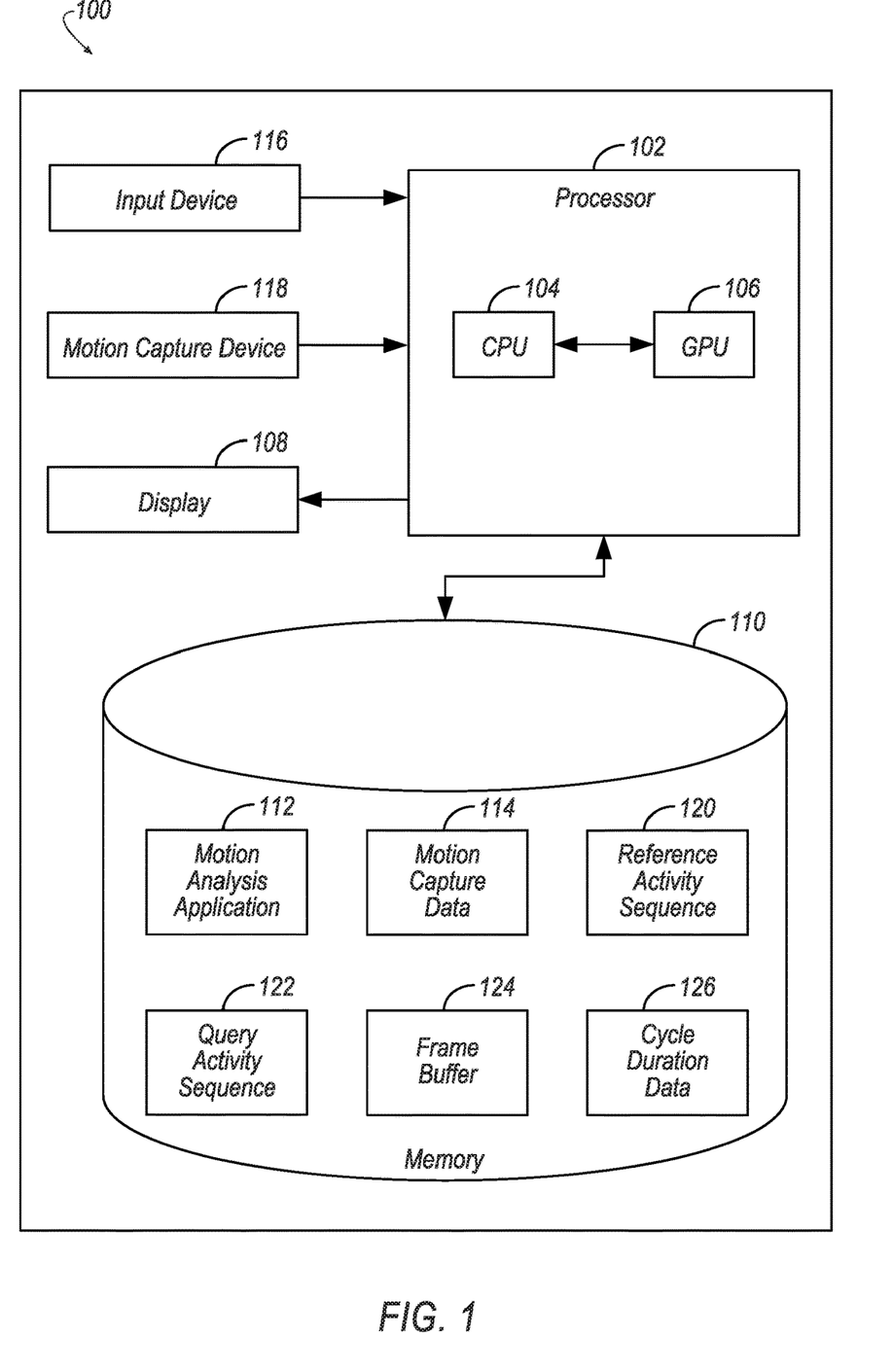
FIG. 1 illustrates an example system for measurement of cycle duration in repeated activity sequences.

FIG. 1 is a schematic diagram of an exemplary embodiment of a system 100 for measurement of cycle duration in repeated activity sequences. The system 100 may quantitatively compute an accuracy, e.g., a deviation from a prescribed motion or gesture and deviation from a target time period for completion, of a movement. The system 100 includes a processor 102 that is operatively connected to a memory 110, input device 116, motion capture device 118, and a display device 108. As is described in more detail below, during operation, the system 100 (i) detects, using a global optimization, a cycle within a frame buffer including frames corresponding to one or more cycles of query activity sequences, the detecting including (a) creating a plurality of cycle segmentations by recursively iterating through the frame buffer to identify candidate cycles corresponding to cycles of the reference activity sequence until the frame buffer lacks sufficient frames to create additional cycles, (b) computing segmentation errors for each of the plurality of cycle segmentations, and (c) identifying the detected cycle as the one of the plurality of cycle segmentations having a lowest segmentation error, (ii) generating cycle duration data for the detected cycle; (iii) removing frames belonging to the detected cycle from the frame buffer; and (iv) outputting the cycle duration data.

In the system 100, the processor 102 includes one or more integrated circuits that implement the functionality of a central processing unit (CPU) 104 and graphics processing unit (GPU) 106. In some examples, the processor 102 is a system on a chip (SoC) that integrates the functionality of the CPU 104 and GPU 106, and optionally other components including, for example, the memory 110, a network device, and a positioning system, into a single integrated device. In other examples the CPU 104 and GPU 106 are connected to each other via a peripheral connection device such as PCI express or another suitable peripheral data connection. In one example, the CPU 104 is a commercially available central processing device that implements an instruction set such as one of the x86, ARM, Power, or MIPS instruction set families.

The GPU 106 may include hardware and software for display of at least two-dimensional (2D) and optionally three-dimensional (3D) graphics to a display device 108. The display device 108 may include an electronic display screen, projector, printer, or any other suitable device that reproduces a graphical display. In some examples, processor 102 executes software programs including drivers and other software instructions using the hardware functionality in the GPU 106 to accelerate generation and display of the graphical depictions of models of human movement and visualizations of quantitative computations that are described herein During operation, the CPU 104 and GPU 106 execute stored program instructions that are retrieved from the memory 110. The stored program instructions include software that control the operation of the CPU 104 and the GPU 106 to perform the operations described herein.

While FIG. 1 depicts the processor 102 as including both the CPU 104 and GPU 106, alternative embodiments may omit the GPU 106, as for example the processor 102 may be of a server that generates output visualization data using only a CPU 104 and transmits the output visualization data to a remote client computing device that uses a GPU 106 and a display device 108 to display the data. Additionally, alternative embodiments of the processor 102 can include microcontrollers, application specific integrated circuits (ASICs), field programmable gate arrays (FPGAs), digital signal processors (DSPs), or any other suitable digital logic devices in addition to or as replacements of the CPU 104 and GPU 106.

In the system 100, the memory 110 includes both non-volatile memory and volatile memory devices. The non-volatile memory includes solid-state memories, such as NAND flash memory, magnetic and optical storage media, or any other suitable data storage device that retains data when the system 100 is deactivated or loses electrical power. The volatile memory includes static and dynamic random-access memory (RAM) that stores program instructions and data, including a motion analysis application 112 and motion capture data 114, during operation of the system 100. In some embodiments the CPU 104 and the GPU 106 each have access to separate RAM devices (e.g., a variant of DDR SDRAM for the CPU 104 and a variant of GDDR, HBM, or other RAM for the GPU 106) while in other embodiments the CPU 104 and GPU 106 access a shared memory device. The memory 110 may store the motion capture data 114 and motion analysis application 112 for maintenance and retrieval.

The input device 116 may include any of various devices that enable the system 100 to receive the motion capture data 114 and motion analysis application 112. Examples of suitable input devices include human interface inputs such as keyboards, mice, touchscreens, voice input devices, and the like, as well. In some examples the system 100 implements the input device 116 as a network adapter or peripheral interconnection device that receives data from another computer or external data storage device, which can be useful for receiving large sets of motion capture data 114 in an efficient manner.

The motion analysis application 112 includes instructions that, when executed by the processor 102 of the system 100, cause the system 100 to perform the processes and operations described herein. These processes and operations include (i) detects, using a global optimization, a cycle within a frame buffer 124 including frames corresponding to one or more cycles of query activity sequences, the detecting including (a) creating a plurality of cycle segmentations by recursively iterating through the frame buffer 124 to identify candidate cycles corresponding to cycles of the reference activity sequence until the frame buffer 124 lacks sufficient frames to create additional cycles, (b) computing segmentation errors for each of the plurality of cycle segmentations, and (c) identifying the detected cycle as the one of the plurality of cycle segmentations having a lowest segmentation error, (ii) generating cycle duration data 126 for the detected cycle; (iii) removing frames belonging to the detected cycle from the frame buffer; and (iv) outputting the cycle duration data 126.

The motion capture data 114 refers to a plurality of records representative of the locations of at least one tracked item or portion of the item over time. For example, the motion capture data 114 may include one or more of: records of positions of a reference point on a body part over time or at set time intervals, sensor data taken over time, a video stream or a video stream that has been processed using a computer-vision technique, data indicative of the operating state of a machine over time, etc. In some cases, the motion capture data 114 may include data representative of more than one continuous movement. For instance, the motion capture data 114 may include a combination of a plurality of combined motion capture data 114 sets.

A motion capture device 118 is a device configured to generate motion capture data 114. Motion capture devices 118 may include, as some non-limiting examples: cameras, visual sensors, infra-red sensors, ultrasonic sensors, accelerometers, pressure sensors, or the like. One non-limiting example of a motion capture device 118 is one or a pair of digital gloves that a user wears while performing cyclical motions. The digital gloves may include sensors that capture the motions of the user to generate the motion capture data 114 that may be stored in the memory 110 or elsewhere to a data storage device.

A movement is an action performed by an operator. A reference movement refers to a baseline or canonical version of the movement. The reference movement may be used as a standard of comparison for other movements, to allow for identification of how close the other movements are to the reference movement.

The motion capture data 114 may be generally classified into one of two categories for the purpose of computing the accuracy of a human motion: a reference activity sequence 120 that includes data representative of the reference or baseline movement, and a query activity sequence 122 that includes data representative of the test movement, i.e., a movement to be compared and quantitatively evaluated for accuracy relative to the baseline movement.

The reference activity sequence 120 may include motion capture data 114 received from the motion capture device 118. The data may also include processed movement data, such as, for example, frame, step, cycle, and time information gleaned from the raw movement data. In one example, the reference movement is represented as a reference activity sequence 120 having an ordered set of frames that each includes motion capture data 114 corresponding to a respective interval of time of the reference movement.

The query activity sequence 122 may also include motion capture data 114 received from the motion capture device 118. In some examples, a movement or movements in the motion capture data 114 includes a label or labels classifying the movements as either reference movements or test movements. The motion analysis application 112 may be programmed is configured to receive instruction for classifying a movement or movements as reference movements or test movements, such as from a user via the input device 116 or from another source.

The motion analysis application 112 may also be programmed to separate a received movement into frames, whereby a "frame" corresponds to a discrete interval of time. In other words, each frame of a movement includes a portion of the motion capture data 114 corresponding to a portion of the movement occurring during a respective interval of the timeline for that movement. In some examples, the duration for the interval corresponding to an individual frame is preset. In some examples, the duration for the interval corresponding to an individual frame is set based on an instruction received from, for example, the user via the input device 116 or another source. In some examples, the duration for the interval corresponding to an individual frame is set with reference to one or more characteristics of the motion capture data 114. For example, in some embodiments, the duration for the interval corresponding to an individual frame is set with reference to one or more of a duration of a reference movement, a total travel distance for the movement, a number of individual motions or gestures within the movement, a speed of the movement, etc. Generally, the same interval for the duration of frames is used for both a reference movement and for test movements to be evaluated relative to the reference movement.

Figure 2:
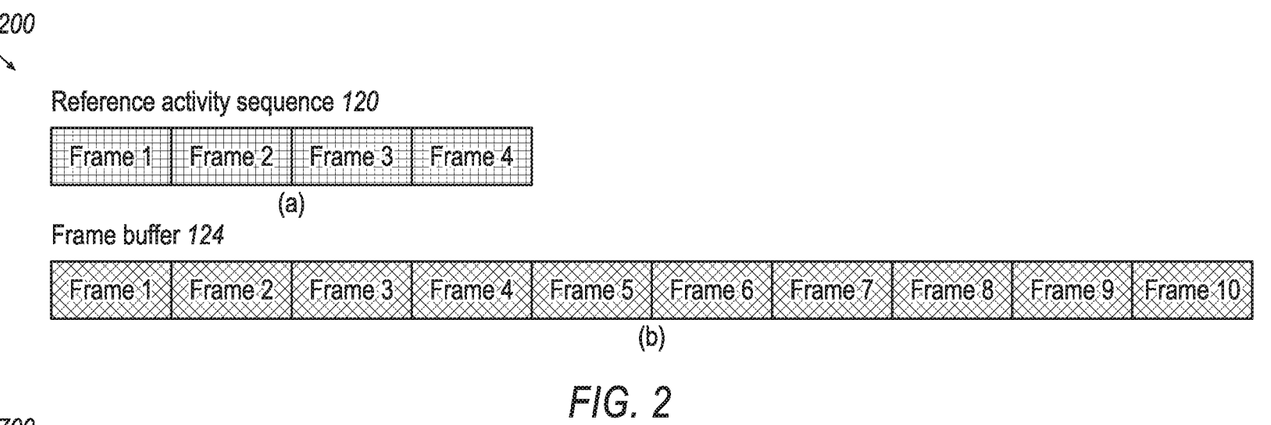
FIG. 2 illustrates an example of a cycle of a reference activity sequence and a frame buffer.

A frame buffer 124 is a data storage configured to hold frames of one or more query activity sequences 122. FIG. 2 illustrates an example of a cycle of a reference activity sequence 120 and a frame buffer 124. As shown, the reference activity sequence 120 includes four frames, while the frame buffer 124 includes repeated query activity sequences 122 with ten frames. The frame buffer 124 may contain all sequences frames if the system 100 is used offline to process saved query activity sequence 122 data. The frame buffer 124 may also be updated dynamically at runtime if the system 100 is used in an online mode to process streaming data. A frame includes motion capture data 114 captured from wearable sensors and a timestamp of the captured data. If the wearable sensors are IMU sensors of a motion capture device 118 (such as a glove or smart clothing), the captured data may be received from accelerometer, gyro, and/or magnetometer sensors.

In some instances, motion capture data 114 may be received as a file of stored motion capture data from a data storage device. In such instances, the motion analysis application 112 may separate the movement or movements in the motion capture data 114 into frames to be added to the frame buffer 124 for further processing.

Referring back to FIG. 1, the cycle duration data 126 may include information indicative of the durations of the cycles in the frame buffer 124. This information may include, in an example, the elapsed time between the first frame and the last frame of the cycle within the frame buffer 124. In an example, the cycle duration data 126 may be displayed to the display device 108. As discussed in greater detail below, the system 100 may be configured to perform measurement of cycle duration of motion capture data 114 in the frame buffer 124 descriptive of repeated query activity sequences 122.

The motion analysis application 112 may also map frames of the test movement to corresponding frames of the reference movement. The cycle duration data 126 may be useful in identifying the boundaries of each of the cycles of query activity sequences 122 for comparison with the reference activity sequence 120. In some examples, the test movement and reference movement are synchronized so that frames of the test movement are mapped to frames of the reference movement that correspond temporally, and in some embodiments, the test movement and the reference movement are aligned in terms of gestures and motions within the movement, such that frames of the test movement are mapped to frames of the reference movement that correspond with regard to the sequence of motions and/or gestures performed in the movement. The motion analysis application 112 may further compute an accuracy of the test movement or test movements relative to the reference movement.

Figure 3:
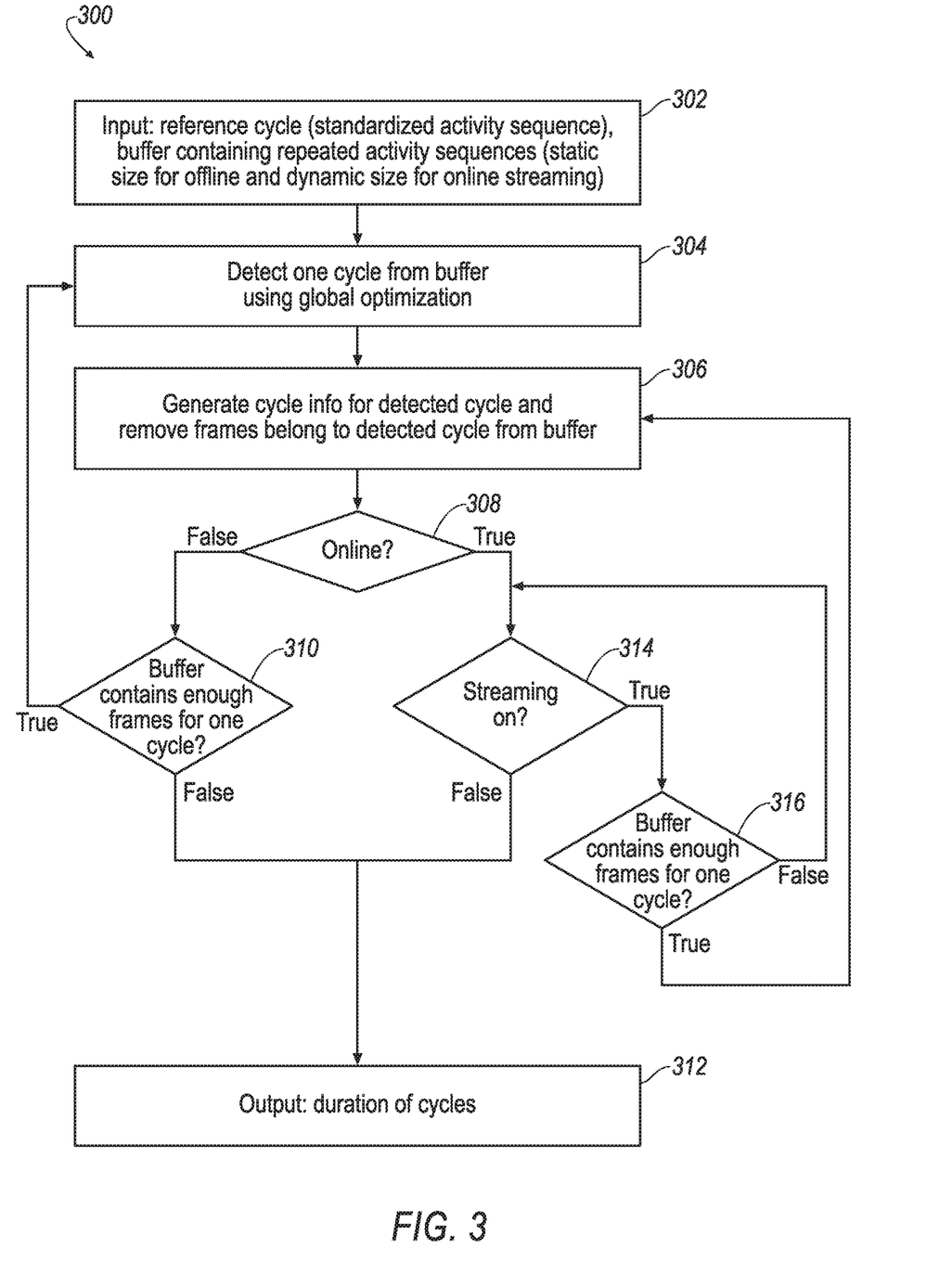
FIG. 3 illustrates an example process for measurement of cycle duration in repeated activity sequences.

FIG. 3 illustrates an example process 300 for measurement of cycle duration in repeated activity sequences. For each iteration, one cycle is detected from the frame buffer 124, the cycle information is generated, and the frames belonging to detected cycle are removed from the frame buffer 124. Such iteration continues until the frame buffer 124 lacks sufficient frames to form an additional cycle. The process 200 may be performed by the processor 102 of the system 100, as discussed in more detail below.

At 302, the processor 102 receives the reference activity sequence 120 and the frame buffer 124 containing repeated query activity sequences 122. In an example, the reference activity sequence 120 may be retrieved from the memory 110. The frame buffer 124 may include one or both of previously-recorded data from the motion capture device 118 and dynamic data streamed at real-time into the frame buffer 124 from the motion capture device 118.

Figure 4:
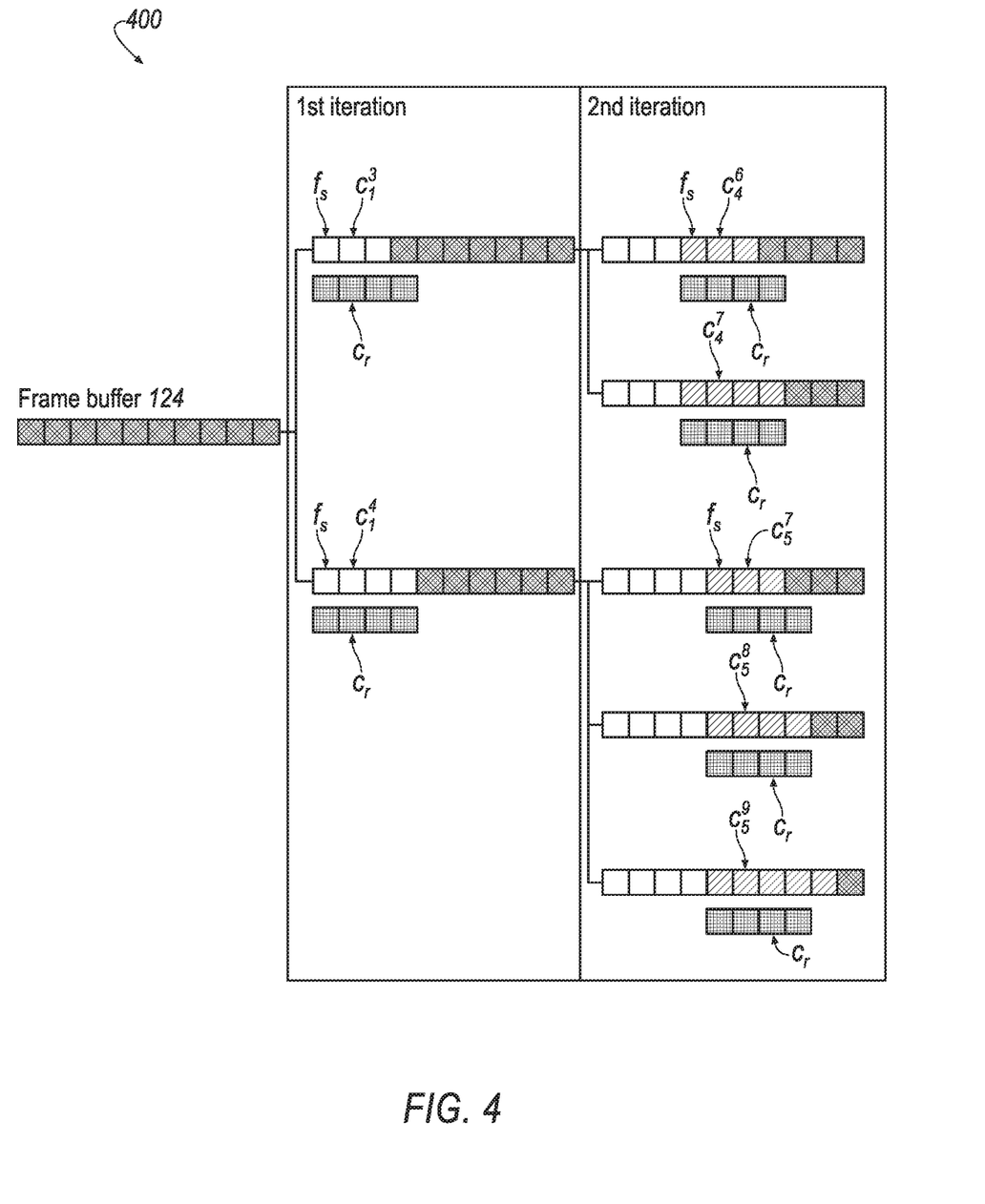
FIG. 4 illustrates an example diagram of a cycle segmentation search within the frame buffer.

At operation 304, the processor 102 detects one cycle from the frame buffer 124 using a global optimization. FIG. 4 illustrates an example diagram 400 of a cycle segmentation search within the frame buffer 124. Each iteration of detection of a cycle finds a cycle that matches the cycle of the reference activity sequence 120 from the remaining data in the frame buffer 124. In other words, to find a cycle in the frame buffer 124 is equivalent to finding a cycle end frame from the remaining data in the frame buffer 124. One method of finding the cycle end frame is first to calculate an error value for each frame. In an example, Equation (1) may be used to calculate the frame error value, as follows:

$$e(f_i) = d(c_s^i, c_r); \tag{1}$$

where
$f_i$ denotes the frame at index i in the buffer;
$c_s^i$ denotes the cycle consisting of frames from frame $f_s$ to frame $f_i$ in buffer;
$c_r$ denotes the reference cycle of the reference activity sequence 120; and
$d(c_s^i, c_r)$ denotes the distance between two cycles.
$f_s$ is the start frame in the frame buffer 124 to search for current cycle. Initially, when beginning the process 300, $f_s$ refers to the first frame in the frame buffer 124. $f_s$ is updated for each iteration as illustrated in the example diagram 400.

An approach to calculate the distance between two cycles is to apply dynamic time warping (DTW) to map two cycles, and then identify the mapping error as the distance of the two cycles. DTW is a technique for comparing sequences that may vary in speed by computing an optimal matching between discreet portions of the sequences. DTW includes computing a "warping path" that corresponds to a mapping between a portion of one sequence and a similar portion of another sequence occurring at a different time or rate. It should be noted that use of DTW is merely one example, and other approaches for determining a distance between two cycles may also be used.

Responsive to calculating the error value of each frame, the cycle end frame may be determined by identifying a local minima of the error values of each frame. Thus, multiple end frames may be found. To limit the final number of end frames, a maximum variance between the local minima may be defined. The cycle is found once the cycle end frame is determined.

The example diagram 400 illustrates two cycles $c_1^3$ and $c_1^4$ as result of first iteration. Meaning, in the first iteration a candidate cycle is indicated as being the first through third frames of the frame buffer 124, and another candidate cycle is indicated as being the first through fourth frames of the frame buffer 124. The example diagram 400 further illustrates five cycles as a result of a second iteration. Assuming the candidate cycle $c_1^3$, two cycles $c_4^6$ and $c_4^7$ are shown as a result of the second iteration. Assuming the candidate cycle $c_1^4$, three cycles $c_5^7$, $c_5^8$, and $c_5^9$ are shown as a result of the second iteration. The iteration to search for the next cycle may continue until the number of iterations exceeds a predefined value or until the frame buffer 124 lacks sufficient frames to form a cycle.

Figure 5:
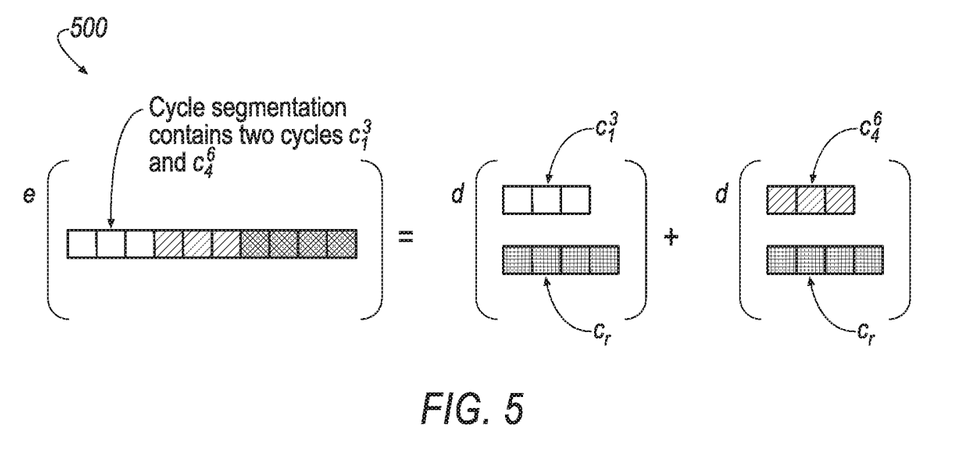
FIG. 5 illustrates an example diagram of a calculation of segmentation error.

FIG. 5 illustrates an example diagram 500 of a calculation of segmentation error. As shown, the segmentation includes two cycles, i.e., $c_1^3$ and $c_4^6$. In one implementation, the error of the segmentation is calculated as the sum of $d(c_1^3, c_r)$ and $d(c_4^6, c_r)$. In another implementation, the error of the segmentation is calculated as the maximum value of $d(c_1^3, c_r)$ and $d(c_4^6, c_r)$. It should be noted that these are merely examples, and other approaches for the calculation of segmentation error may be used.

Figure 6:
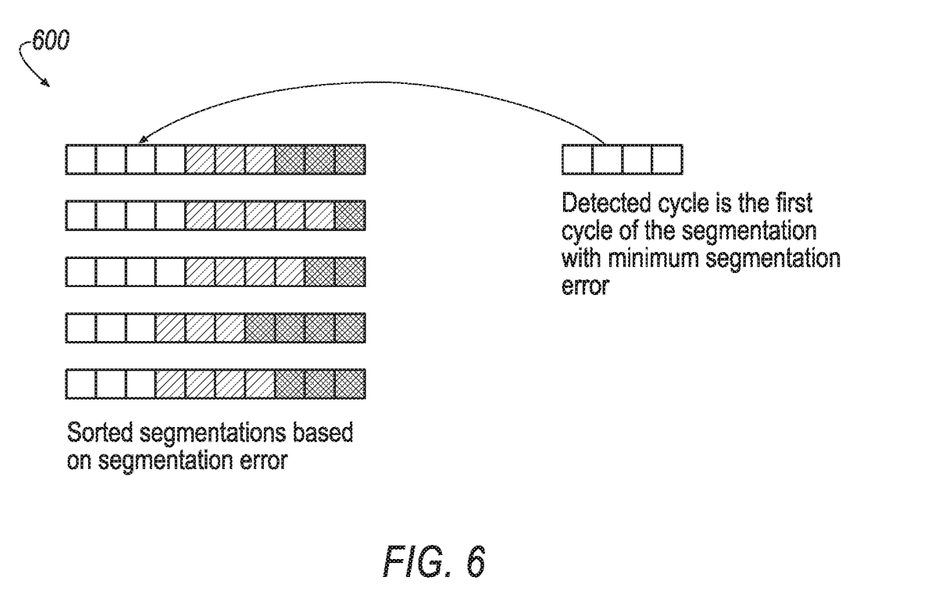
FIG. 6 illustrates an example diagram of a determination of cycles from the calculated segmentations.

FIG. 6 illustrates an example diagram 600 of a determination of cycles from all of the calculated segmentations. In an example, the segmentations generated as result of the approach illustrated in FIG. 4 are sorted based on the segmentation error, which may be calculated according to the approach illustrated in FIG. 5. The first cycle of the segmentation, i.e., the one having the minimum segmentation error is determined as the result.

At operation 306, the processor 102 generates cycle information for the detected cycle and removes frames of the detected cycle from the frame buffer 124. Since frame data of the frame buffer 124 contains timestamp information, once the cycle is detected, cycle duration data 126 may be determined by calculating the elapsed time between the first frame and the last frame of the cycle.

Figure 7:
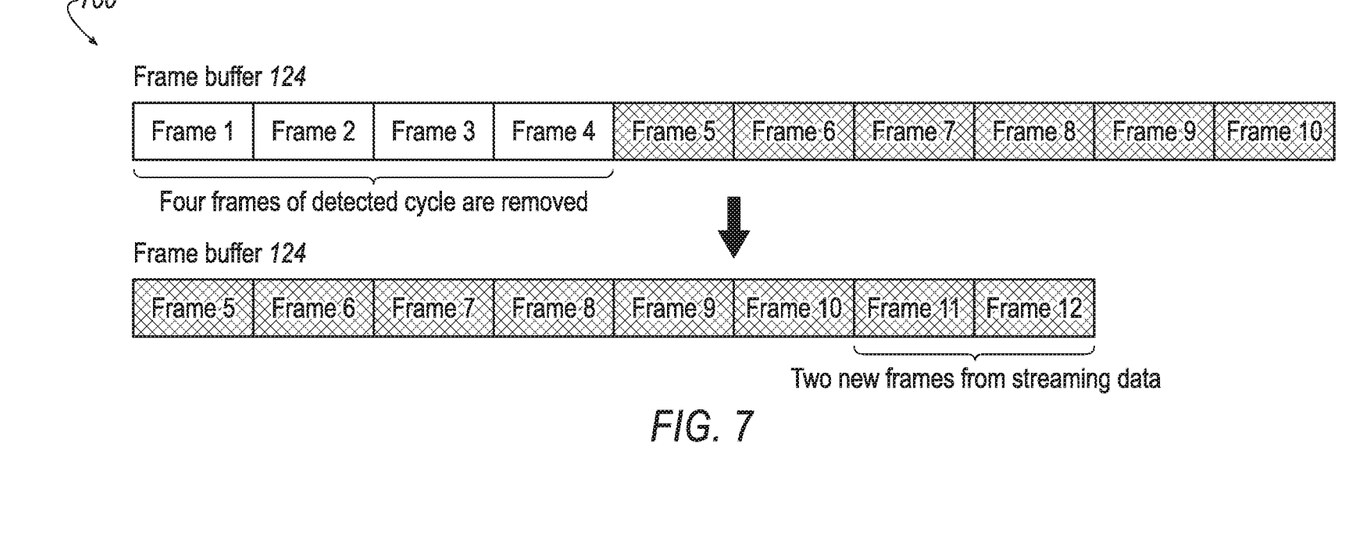
FIG. 7 illustrates an example of preparation of the frame buffer for detection of the next cycle.

FIG. 7 illustrates an example of preparation of the frame buffer 124 for detection of the next cycle. In an example, the frames of the detected cycle are removed from the frame buffer 124. If the system 100 is used in an online system to process streaming data, detecting cycles and capturing new data may be performed concurrently. In such a situation, the frame buffer 124 may be updated dynamically during runtime. As shown in FIG. 7, two new frames are added to the frame buffer 124 from streaming data. Responsive to the updated buffer containing enough frames to form one cycle, the processing to detect an additional cycle may be repeated.

Accordingly, at operation 308, the processor 102 determines whether the system 100 is operating in an online mode. In an example, the processor 102 may identify from a setting stored to the memory 110 that the system 100 is operating in an online mode. Additionally or alternately, the processor 102 may identify that the system 100 is operating in an online mode according to connection of the processor 102 to a source of motion capture data 114, such as via a motion capture device 118 or over a network, e.g., from an input device 116 received data over a network from a motion capture device 118 or data storage. If the system 100 is not operating in online mode, control passes to operation 310. If the system is operating in online mode, control passes to operation 314.

At operation 310, the processor 102 determines whether the frame buffer 124 contains sufficient frames for one cycle. In an example, the processor 102 may verify that the frame buffer 124 contains at least a predefined threshold number of frames (e.g., at least one frame, at least a predefined number of frames, at least the number of frames of a defined quantity of average cycles, at least the number of frames of the shortest cycle, at least a percentage amount of the length in frames of the reference activity sequence 120, etc.) If the frame buffer 124 contains sufficient frames, control passes to operation 304 to detect an additional cycle. Otherwise, control passes to operation 312.

At operation 312, the processor 102 outputs the duration of the detected cycles. In an example, the cycle duration data 126 indicative of the durations of the detected cycles includes the elapsed time between the first frame and the last frame of the cycle. After operation 312, the process 300 ends.

At operation 314, the processor 102 determines whether streaming is active. In an example, the processor 102 may identify whether the additional motion capture data 114 has been received (e.g., from the motion capture device 118, from a network connection, from a data storage, etc.). Additionally or alternatively, the processor 102 may identify that the system 100 streaming is active according to continued connection of the processor 102 to a source of motion capture data 114, such as continued connection to the motion capture device 118, network, input device 116, or data storage. If streaming is active, control passes to operation 316. Otherwise control passes to operation 312.

At operation 316, the processor 102 determines whether the frame buffer 124 contains sufficient frames for one cycle, similar to as discussed above with respect to operation 310. If so, control passes to operation 304 to detect an additional cycle. If not, control passes to operation 314 to determine whether streaming is active.

Thus, the described approach provides a scalable solution to measure cycle duration in repeated human physical activities from IMU data, for repeated activity sequences with high standardization level, as well as repeated activity sequences with abnormal activities.

As a further enhancement, the size of the frame buffer 124 may be adapted based on the quality of the results being produced by the approach. If the system 100 is achieving good results in identification of results with the frame buffer 124, then the length of the frame buffer 124 may be reduced to reduce latency in the determination of cycles. However, if the system 100 is achieving poor results in identification of results with the frame buffer 124, then the length of the frame buffer 124 may be increased to improve accuracy, but with a potential increase in latency. For instance, the processor 102 may increase a length in frames of the frame buffer 124 responsive to the segmentation error for the detected cycle being above a predefined threshold error value, and/or the processor 102 may decrease the length in frames of the frame buffer 124 responsive to the segmentation error for the detected cycle being below a predefined threshold error value.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for measurement of cycle duration in repeated activity sequences, comprising:
    a display device;
    a memory configured to store a motion analysis application and motion capture data including a reference activity sequence and a frame buffer including frames corresponding to one or more cycles of query activity sequences; and
    a processor, operatively connected to the memory and the display device, and configured to execute the motion analysis application to
        detect a cycle within the frame buffer using a global optimization, including to
            create a plurality of cycle segmentations by recursively iterating through the frame buffer to identify candidate cycles corresponding to cycles of the reference activity sequence until the frame buffer lacks sufficient frames to create additional cycles,
            compute segmentation errors for each of the plurality of cycle segmentations, and
            identify the detected cycle as the one of the plurality of cycle segmentations having a lowest segmentation error,
        generate cycle duration data for the detected cycle,
        remove frames belonging to the detected cycle from the frame buffer, and
        output the cycle duration data to the display device.

2. The system of claim 1, wherein the processor is further configured to execute the motion analysis application to continue to detect additional cycles within the frame buffer using the global optimization until the frame buffer lacks sufficient cycles for an additional cycle.

3. The system of claim 1, wherein the frames of the frame buffer include timestamp information, and the processor is further configured to execute the motion analysis application to generate the cycle duration data by calculating an elapsed time between the timestamp information of a first frame of the detected cycle and the timestamp information of a last frame of the detected cycle.

4. The system of claim 1, wherein the processor is further configured to execute the motion analysis application to, responsive to streaming of frame data being active and additional frames being received, append the additional frames to an end of the frame buffer.

5. The system of claim 1, wherein the processor is further configured to execute the motion analysis application to, responsive to streaming of frame data being active and the frame buffer lacking sufficient frames to create additional cycles, wait for additional frames to be received to the processor.

6. The system of claim 1, wherein the processor is further configured to execute the motion analysis application to compute the segmentation errors for each of the plurality of cycle segmentations according to a sum of the segmentation errors of the candidate cycles in the respective cycle segmentation.

7. The system of claim 1, wherein the processor is further configured to execute the motion analysis application to compute the segmentation errors for each of the plurality of cycle segmentations according to a maximum of the segmentation errors of the candidate cycles in the respective cycle segmentation.

8. The system of claim 1, wherein the processor is further configured to execute the motion analysis application to increase a length in frames of the frame buffer responsive to the segmentation error for the detected cycle being above a predefined threshold error value.

9. The system of claim 1, wherein the processor is further configured to execute the motion analysis application to decrease a length in frames of the frame buffer responsive to the segmentation error for the detected cycle being below a predefined threshold error value.

10. A method for measurement of cycle duration in repeated activity sequences, comprising:
    detecting, using a global optimization, a cycle within a frame buffer including frames corresponding to one or more cycles of query activity sequences, the detecting including
        creating a plurality of cycle segmentations by recursively iterating through the frame buffer to identify candidate cycles corresponding to cycles of a reference activity sequence until the frame buffer lacks sufficient frames to create additional cycles,
        computing segmentation errors for each of the plurality of cycle segmentations, and
        identifying the detected cycle as the one of the plurality of cycle segmentations having a lowest segmentation error,
    generating cycle duration data for the detected cycle;
    removing frames belonging to the detected cycle from the frame buffer; and
    outputting the cycle duration data.

11. The method of claim 10, further comprising continuing to detect additional cycles within the frame buffer using the global optimization until the frame buffer lacks sufficient cycles for an additional cycle.

12. The method of claim 10, wherein the frames of the frame buffer include timestamp information, and further comprising generating the cycle duration data by calculating an elapsed time between the timestamp information of a first frame of the detected cycle and the timestamp information of a last frame of the detected cycle.

13. The method of claim 10, further comprising, responsive to streaming of frame data being active and additional frames being received, appending the additional frames to an end of the frame buffer.

14. The method of claim 10, further comprising, responsive to streaming of frame data being active and the frame buffer lacking sufficient frames to create additional cycles, waiting for additional frames to be received.

15. The method of claim 10, further comprising computing the segmentation errors for each of the plurality of cycle segmentations according to a sum of the segmentation errors of the candidate cycles in the respective cycle segmentation.

16. The method of claim 10, further comprising computing the segmentation errors for each of the plurality of cycle segmentations according to a maximum of the segmentation errors of the candidate cycles in the respective cycle segmentation.

17. The method of claim 10, further comprising increasing a length in frames of the frame buffer responsive to the segmentation error for the detected cycle being above a predefined threshold error value.

18. The method of claim 10, further comprising decreasing a length in frames of the frame buffer responsive to the segmentation error for the detected cycle being below a predefined threshold error value.

19. A non-transitory computer readable medium comprising instructions of a motion analysis application that, when executed by one or more processors, cause the one or more processors to:
    detect, using a global optimization, a cycle within a frame buffer including frames corresponding to one or more cycles of query activity sequences, the detection including to
        create a plurality of cycle segmentations by recursively iterating through the frame buffer to identify candidate cycles corresponding to cycles of a reference activity sequence until the frame buffer lacks sufficient frames to create additional cycles,
        compute segmentation errors for each of the plurality of cycle segmentations, and
        identify the detected cycle as the one of the plurality of cycle segmentations having a lowest segmentation error,
    generate cycle duration data for the detected cycle;
    remove frames belonging to the detected cycle from the frame buffer;
    continue to detect additional cycles within the frame buffer using the global optimization until the frame buffer lacks sufficient cycles for an additional cycle; and
    output the cycle duration data.

20. The medium of claim 19, further comprising instructions of the motion analysis application that, when executed by one or more processors, cause the one or more processors to, responsive to streaming of frame data being active and additional frames being received concurrent to the processing of the detecting of cycles using the global optimization, append the additional frames to an end of the frame buffer.

* * * * *